United States Patent [19]

Van Gils

[11] Patent Number: 4,512,031
[45] Date of Patent: Apr. 16, 1985

[54] ARRANGEMENT FOR RECEIVING TV-SIGNALS HAVING LEFT AND RIGHT STEREO SOUND SIGNALS

[75] Inventor: Cornelis J. M. Van Gils, Eindhoven, Netherlands

[73] Assignee: U.S. Philips Corporation, New York, N.Y.

[21] Appl. No.: 408,584

[22] Filed: Aug. 17, 1982

[30] Foreign Application Priority Data

Sep. 8, 1981 [NL] Netherlands ............... 8104156

[51] Int. Cl.³ .................. H04H 5/00; H04N 5/60
[52] U.S. Cl. ............................ 381/2; 358/144; 358/198; 381/3
[58] Field of Search ............ 381/1, 2, 3, 7, 15; 358/143, 144

[56] References Cited

U.S. PATENT DOCUMENTS 4,389,536 6/1983 Schickedanz ............ 358/198 X

FOREIGN PATENT DOCUMENTS 2902933 7/1980 Fed. Rep. of Germany ...... 358/144

Primary Examiner—R. J. Hickey
Attorney, Agent, or Firm—Thomas A. Briody; William J. Streeter; Edward W. Goodman

[57] ABSTRACT

Arrangement for receiving TV signals containing left and right stereo sound signals, a first sound carrier being frequency-modulated by the sum signal (L+R) of the two stereo sound signals and the second carrier being frequency-modulated by twice the right stereo sound signal (2R), comprising a first FM-demodulator for demodulating the sum signal from the first sound carrier and a second FM-demodulator for demodulating twice the right stereo sound signal from the second sound carrier, a matrix circuit for deriving at least the left stereo sound signal from the sum signal and twice the right stereo sound signal and a left and right sound channel for the respective left and right stereo sound signals, the possibility of a simple mono-stereo signal control being obtained such as it is already known for prior art stereo radio receivers in addition to an advantageous noise distribution over the left and the right stereo sound channels. For this purpose the said matrix circuit consists of a first sub-matrix for deriving a difference signal (L−R and/or R−L) of the two stereo sound signals from the sum signal and twice the right stereo sound signal, and a second sub-matrix for deriving at least the left stereo sound signal from the sum signal and the difference signal.

5 Claims, 3 Drawing Figures

ARRANGEMENT FOR RECEIVING TV-SIGNALS HAVING LEFT AND RIGHT STEREO SOUND SIGNALS

BACKGROUND OF THE INVENTION

The invention relates to an arrangement for receiving TV-signals containing left and right stereo sound signals, a first sound carrier being frequency-modulated by the sum signal (L+R) of the two stereo sound signals and a second sound carrier being frequency-modulated by twice the right stereo sound signal (2R), comprising a first FM demodulator for demodulating the sum signal from the first sound carrier and a second FM-demodulator for demodulating twice the right stereo sound signal from the second sound carrier, a matrix circuit for deriving at least the left stereo sound signal from the sum signal and twice the right stereo sound signal, and a left and a right sound channel for the respective left and right stereo sound signals.

It is known, in the transmission of TV-signals having left and right stereo sound signals, to modulate the first sound carrier by the sum signal (L+R) of the two stereo sound signals and to modulate the second sound carrier by the different signal (L−R) of the two sound signals. This has on the one hand the advantage that monophonic TV receivers which are only capable of receiving and demodulating the first sound carrier, reproduce the sum signal which corresponds to the average between the left and the right stereo sound signals. In addition, this system has the advantage that in a stereo receiver it is possible to recover in a simple manner (by addition and subtraction) the signals L and R and that in the L−R channel of the receiver, several features can be included, such as, for example, a mono-stereo change-over device (by blocking or not blocking the L−R channel), an arrangement for the gradual transition from stereo to mono (by increasing the attenuation in the L−R channel), a spatial-stereo arrangement (by additional amplification of the L−R signal with respect to the L+R signal) and/or a stereo-indication arrangement for indicating actual stereo transmissions.

As described in the German Offenlegungsschrift 28 27 159, such a system has, however, the disadvantage that any correlated interferences present in the two sound carriers find their way into the left sound channel of the receiver only and in order to obviate this disadvantage the German Offenlegungsschrift proposes a system wherein L+R is transmitted over the first sound carrier and 2R is transmitted over the second sound carrier, resulting in correlated interferences being distributed equally over the two sound channels. The receiver disclosed in that German Offenlegungsschrift and described in the opening paragraph comprises a dematrixing circuit, the 2R signal received via the second carrier being halved and the R signal thus obtained being subtracted from the L+R signal which was received over the first carrier. In this way, it is however not possible to realize the advantages of a system in which on the one hand L+R and on the other hand L−R are received.

SUMMARY OF THE INVENTION

The invention has for its object to provide a receiver of the type described in the opening paragraph in which the advantage of both systems can be combined and according to the invention the receiving arrangement is therefore characterized in that the matrix circuit is formed by a first sub-matrix for deriving the difference signal (L−R and/or R−L) of the two stereo sound signals from the sum signal and twice the right stereo sound signal, and a second sub-matrix for deriving at least the left stereo sound signal from the sum signal and the difference signal.

When the measure in accordance with the invention is used, the left stereo sound signal is furthermore obtained by simply adding together the sum signal and the difference signal. Halving the amplitude of one signal relative to the other signal before adding these signals to each other, as is done in the prior art, is avoided.

A preferred embodiment of the receiving arrangement in accordance with the invention is characterized by a difference signal adjusting circuit arranged between the first and the second sub-matrices for symmetrically adjusting the cross-talk attenuation between the left and right stereo channels.

When this measure is used, the availability of the difference signal is advantageously used to realize a crosstalk attenuation, which is continuously or not continuously controllable by means of an amplitude control of the difference signal and which may be both positive (mono-stereo transition) and negative (enhanced stereo).

A further preferred embodiment of such a receiving arrangement in accordance with the invention is characterized by a sum signal adjusting circuit for controlling the supply of the sum signal to the second sub-matrix, the control of the sum signal adjusting circuit being opposite to the control of the difference signal adjusting circuit.

When this measure is used three advantages, which are disclosed in the description of the Figures, are obtained.

A further preferred embodiment of the receiving arrangement in accordance with the invention is characterized by a further signal transmission path between the output of the second FM-demodulator and the second sub-matrix for applying the sound signal demodulated by the second FM-demodulator to the two sound channels in the case non-stereophonic sound signals are received.

DESCRIPTION OF THE DRAWINGS

The invention will now be further described by way of example with reference to the Figures shown in the accompanying drawings.

Herein.

DESCRIPTION OF THE PREFERRED EMBODIMENT

Figure 1:
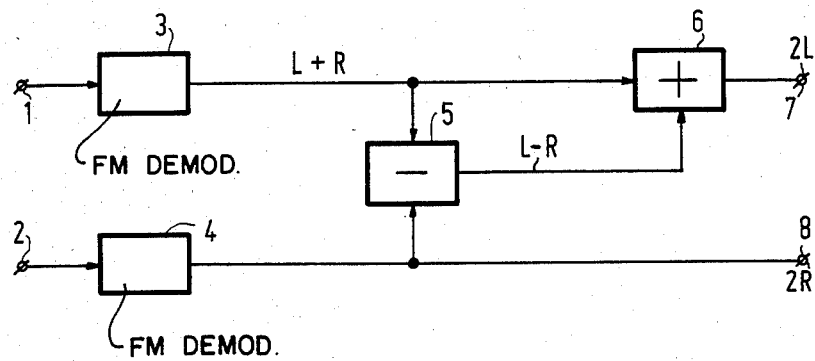
FIG. 1 shows a basic circuit diagram of an arrangement in accordance with the invention.

In FIG. 1, reference numeral 1 denotes an input terminal to which a first carrier of, for example, 5.5 MHz, whose frequency is modulated by the sum signal (L+R), is applied and reference numeral 2 denotes an input terminal to which a second carrier of, for example, 5.742 MHz, whose frequency is modulated by twice the right signal (2R), is applied. In a first FM-demodulator 3 the first carrier is demodulated and the second carrier is demodulated in a second FM-demodulator 4. The demodulated output signal (L+R) from demodulator 3 and the demodulated output signal (2R) from demodulator 4 are subtracted from each other in a first sub-matrix 5 in such a manner that the difference signal (L−R or R−L) of the stereophonic sound signals is produced. In a second sub-matrix 6 the sum signal (L+R) coming from the detector 3 and the difference signal (L−R or R−L) coming from the first sub-matrix 5 are combined in such a manner that the left stereo sound signal (2L) is obtained which is thereafter applied to the left sound channel 7. The signal for the right sound channel 8 may be obtained directly from the second FM-demodulator 4 or via a further combination of the sum and difference signal (see FIG. 2).

The two sub-matrices 5 and 6 may be incorporated in an integrated circuit, the output terminal of the sub-matrix 5 being realized, for example, as a separate IC-connection. By means of this connection one or more of the functions described in the opening paragraph can be performed.

Figure 2:
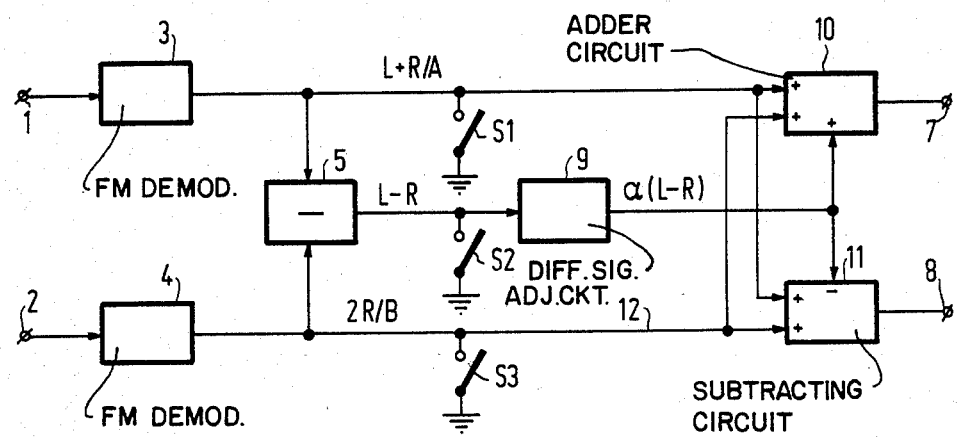
FIG. 2 shows a second basic circuit diagram of an arrangement in accordance with the invention.

In the basic circuit diagram of FIG. 2, elements corresponding with those shown in FIG. 1 are given the same reference numerals. The output signal (L−R) of the first sub-matrix 5 is multiplied by a factor $\alpha$ in a preferably electronically controllable difference signal adjusting circuit 9. In this embodiment the second sub-matrix is formed by an adder circuit 10 and a subtracting circuit 11. In the adder circuit 10 the signals L+R and $\alpha$ (L−R) are added together so that the signal L+R+$\alpha$(L−R)=(1+$\alpha$)L+(1−$\alpha$)R is available at the left sound channel 7. In the subtracting circuit 11 the signals L+R and $\alpha$ (L−R) are subtracted from each other so that the signal L+R−$\alpha$(L−R)=(1+$\alpha$)R+(1−$\alpha$)L is available at the right sound channel 8. It should be noted that if the factor $\alpha$ is adjusted in the controllable difference signal adjusting circuit 9 to $\alpha=1$, 2L is available at the channel 7 and 2R is available at channel 8; this results in an accurate stereo reproduction. In the event that $\alpha=0$, L+R is available at both channels; this results in a mono reproduction. In the event that $0<\alpha<1$, the sound is reproduced with a reduced stereo effect. In the event that $\alpha>1$, then an enhanced stereo effect (spatial-stereo) is obtained. So by means of the difference signal adjusting circuit 9, the cross-talk attenuation between the left and right sound channels can be symmetrically adjusted. The factor $\alpha$ is preferably adjusted by means of variable potentiometers or fixed switching resistors. It is also possible to adjust this factor by means of remote control using a direct voltage which can be adjusted elsewhere in the circuit arrangement by means of change-over switches or potentiometers. This direct voltage may, for example, alternatively be varied in dependence on the strength of the received TV signals and can be obtained from the AVC-circuit in the TV-receiver. As the strength of the signal increases a gradual transition from mono to stereo reception can be effected.

The circuit shown in FIG. 2 comprises further elements which are operational when two non-stereophonic signals (A and B) are transmitted by means of the carriers. These elements comprise a direct connection 12 to apply the output signal from demodulator 4 to the adder and subtracting circuits 10 and 11 and of three switches S1, S2 and S3 with which the several operating conditions: stereo, mono, sound A or sound B can be adjusted in accordance with the following Table:

|    | stereo | mono | sound A | sound B |
|----|--------|------|---------|---------|
| S1 | 0      | 0    | 0       | 1       |
| S2 | 0      | 1    | 1       | 1       |
| S3 | 1      | 1    | 1       | 0       |

0 = non-conductive, open
1 = conducting, short-circuit

In the event of stereo reception, S3 short-circuits the connection 12. To avoid a short-circuiting of the 2R signal, which is applied to the first sub-matrix 5, the connection 12 may include a signal separator (not shown), which is inserted between the sub-matrix 5 and the switch S3. The operation proceeds as described in the foregoing. In the event of mono-reception both the connection 12 and the L−R channel are short-circuited, so that both channels 7 and 8 receive the L+R signal. In the event of dual information reception and reproduction of the signal A, this sound signal A is applied to the two channels 7 and 8 in a similar way as in mono reception.

For reproduction of the sound B, S1 and S2 are short-circuited. The signal B from the demodulator 4 is applied the two sound channels 7 and 8 via the connection 12 and the matrix circuits 10 and 11.

The switches S1, S2 and S3 may be controlled via a logic circuit (not shown). This logic circuit itself is controlled by the known identification signal conveyed on the second carrier, and by switches which are operated by the user himself.

Figure 3:
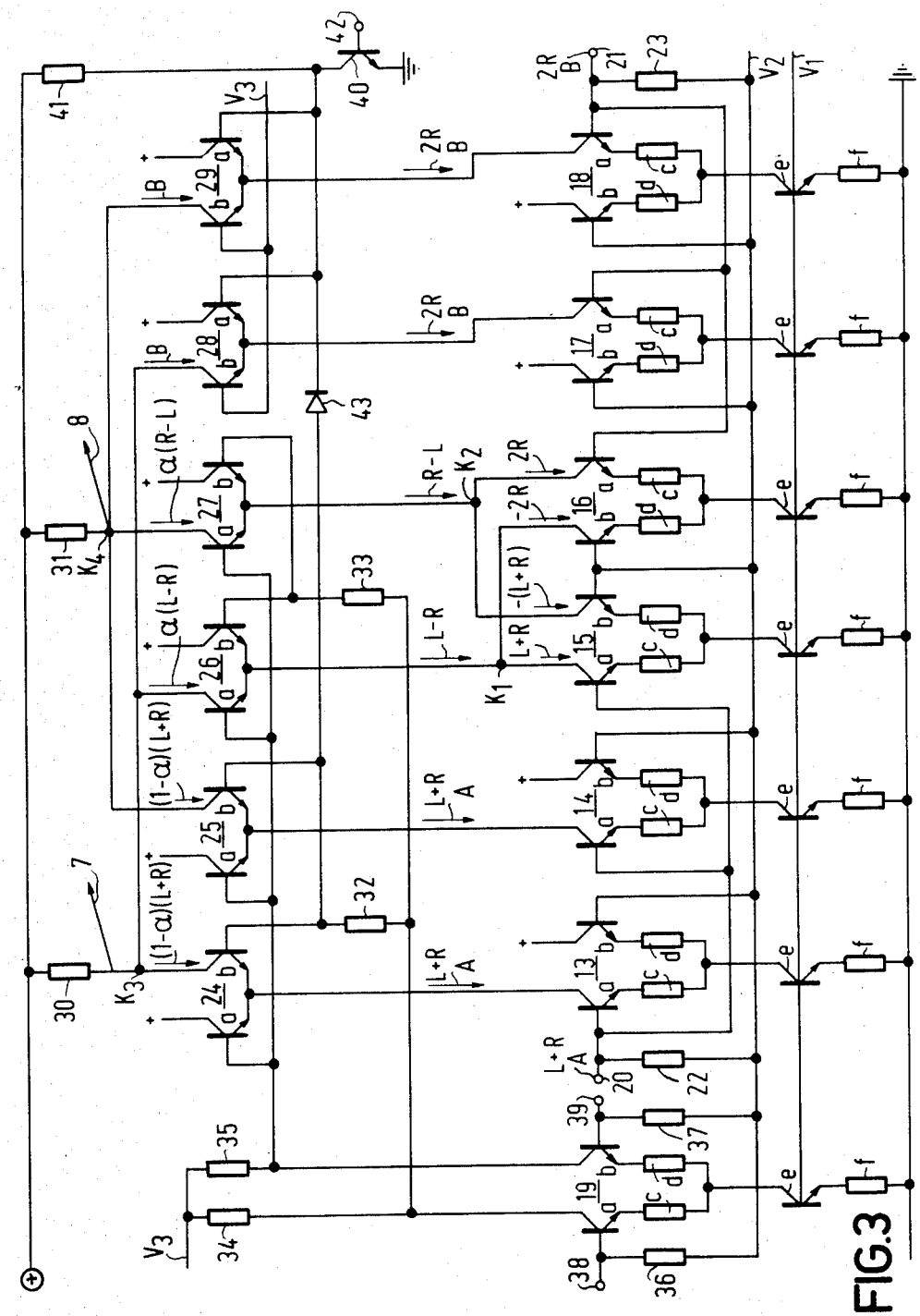
FIG. 3 is an elaboration of an embodiment of an arrangement in accordance with the invention.

The embodiment shown in FIG. 3 is particularly suitable for realization in the form of an integrated circuit. This integrated circuit comprises six, preferably identical, signal current generators in the form of differential amplifiers 13 to 18, inclusive, and a differential amplifier 19 for a control signal. Each differential amplifier 13–19 comprises two transistors a and b, each having respective emitter resistors c and d which are jointly connected to the collector electrode of a transistor e which functions as a direct current source and has an emitter resistor f. The emitter resistors f are connected to ground, the base electrodes of the transistors e are all connected to a constant bias voltage V1 and the base electrodes of the transistors b are all connected to a constant bias voltage V2. The base electrodes of the transistors a of the differential amplifier 13, 14 and 15 are connected to an input terminal 20 to which the signal L+R or A, respectively, coming from the first FM-demodulator (3 in FIG. 2), is applied, and the base electrodes of the transistors a of the differential amplifiers 16, 17 and 18 are connected to an input terminal 21 to which the signal 2R or B, respectively, coming from the second FM-demodulator (4 in FIG. 2), is applied. The base electrodes of the transistors a in the differential amplifiers 13–15 and 16–18 receive the bias voltage V2 via respective resistors 22 and 23.

The collector electrodes of the transistors b of the differential amplifiers 13, 14, 17 and 18 are connected to the positive supply voltage (+). In the configuration described, the collector electrodes of the transistors 13a, 14a, 15a produce mutually equal signal currents L+R (A, respectively) and the collector electrodes of the transistors 16a, 17a, 18a produce mutually equal signal currents 2R (or B, respectively); the collector electrodes of the transistors 15b and 16b produce signal currents of the form −(L+R) and −2R.

The collector electrodes of the transistors 15a and 16b are interconnected at a junction point K1. Consequently, at this junction point signal currents L+R and −2R are combined to form the difference current L−R. Likewise, the collector electrodes of the transistors 15b and 16a are interconnected at junction point K2, in which the currents −(L+R) and 2R are combined to form the difference current R−L. The junction points K1, K2 consequently form the first sub-matrix (compare 5 in FIGS. 1 and 2).

As the differential amplifiers for the input signals applied via the terminals 20 and 21, are high-ohmic and, in addition, fully identical, accurately balanced signals L−R and R−L can be obtained, and a symmetry adjustment which is effected in the prior art circuit is now generally not necessary.

The signal currents thus obtained are applied to signal current controllers 24 to 29, inclusive, each comprising two emitter-coupled transistor a and b, the signal current to be controlled being applied to the coupled emitter electrodes of the transistors a and b. The extent of control is obtained in known manner by controlling the difference voltage between the base electrodes.

The controller 24 is coupled to the output of differential amplifier 13, the controller 25 to the output of differential amplifier 14, the controller 26 to the junction point K1, the controller 27 to the junction point K2, the controller 28 to the output of differential amplifier 17 and the controller 29 to the output of the differential amplifier 18. The collector currents of the transistors 24b, 26a and 28b are combined at a junction point K3 and flow thereafter to the positive supply voltage terminal (+) via a common collector resistor 30. The junction point K3 then performs the function of the matrix circuit 10 of FIG. 2. The output signal for sound channel 7 is taken from K3. Likewise, the collector currents from the transistors 25b, 27a and 29b are combined at a junction point K4 and flow thereafter to the supply voltage terminal (+) via a common collector resistor 31. The junction point K4 then performs the function of the matrix circuit 11 of FIG. 2 and the output signal for the sound channel 8 is taken from K4. The collector currents from the transistors 24a, 25a, 26b, 27b, 28a and 29a are not used and flow to the positive supply voltage terminal (+).

The base difference voltage for the controllers 24, 25, 26 and 27 is derived from the collector electrodes of the differential amplifier 19. The collector electrodes of the transistor 19b is connected to the base electrodes of the transistors 24a, 25a, 26a and 27a; the collector electrode of the transistor 19a is connected to the base electrodes of the transistors 24b and 25b via a resistor 32 and to the base electrodes of the transistors 26b and 27b via a resistor 33. Under the influence of the base difference voltage produced by the differential amplifier 19, a portion $\alpha$ (L−R), wherein $0 \leq \alpha \leq 1$, of the current (L−R) flows from the junction point K1 to junction point K3 via the transistor 26a, while the remaining portion $(1-\alpha)$ (R−L) flows unused to the supply voltage terminal (+) via transistor 27b. Likewise the portion $\alpha$ (R−L) of the current (R−L) flows from K2 to the junction point K4 via transistor 27a, while the remaining portion $(1-\alpha)$ (L−R) flows unused to the supply voltage terminal (+) via transistor 26b. The controllers 26 and 27 thus perform the function of the difference signal adjusting circuit 9 of FIG. 2, it being possible to adjust the reproduction to an increased extent to mono or to an increased extent to stereo by reducing or increasing the factor.

Additional improvements compared with the circuit of FIG. 2 can be achieved by means of the controllers 24 and 25 which form a sum signal adjusting circuit and control the supply of the sum signal L+R to the junction points K3 and K4, more specifically inversely to the control of the difference signal by the controllers 26, 27. The portion $(1-\alpha)$ (L+R) of the signal current L+R of the transistor 13a is applied to the junction point K3 via the transistor 24b and likewise the portion $(1-\alpha)$ (L+R) of the signal current L+R produced by the transistor 14a is applied to the junction point K4 via the transistor 25b.

In the event $\alpha=0$, both junction points K3 and K4 receive the sum signal L+R (via transistor 24b and 25, respectively): this corresponds to monaural sound reception. In the event $\alpha=\frac{1}{2}$ (which is the case if the collector voltages of the transistors 19a and 19b are equal) then transistor 24b applies $\frac{1}{2}$(L+R) and transistor 26a applies $\frac{1}{2}$(L−R) to the junction point K3, so that this junction point receives the signal current L. At the same time transistor 25 applies $\frac{1}{2}$(L+R) and transistor 27a applies $\frac{1}{2}$(R−L) to the junction point K4, so that this junction point receives the signal current R. This setting corresponds to stereo reception. It will be clear that gradually varying $\alpha$ from the value zero to the value $\frac{1}{2}$ causes the sound reproduction to change gradually from mono to stereo reception.

If the factor $\alpha$ is set between $\frac{1}{2}$ and 1, then the L−R current applied to the junction points K3 and K4 exceeds the L+R component, causing a stereo reproduction which is commonly referred to as enhanced or spatial stereo. When $\alpha=1$, the L−R component is at its maximum and the L+R component has completely disappeared, so that maximum enhanced stereo occurs.

A first advantage of the controllers 24–25 for the L+R signal, these controllers controlling inversely to the control of the controllers for the L−R signal, is that a controller which varies the L−R signal between 0 and 1 is sufficient for the overall range from mono ($\alpha=0$) via stereo ($\alpha=\frac{1}{2}$) to maximum enhanced stereo ($\alpha=1$). Without the provision of L+R controllers it would be necessary for the L−R controllers to be controllable over a much wider range.

A second advantage is that the overall sound volume at the change-over from mono via stereo to enhanced stereo is more gradual than in a system having a constant L+R component.

A third advantage is that these controllers may also serve as signal switches for applying or not applying the A signal in the case of non-stereophonic dual-information reception; this will be further described hereinafter.

The control signal-differential amplifier 19 comprises in addition to the components already mentioned two equal collector resistors 34 and 35 which are connected to a constant voltage V3, as well as two equal base resistors 36 and 37 which are connected to the constant voltage V2. In addition, the base electrode of the transistor 19a is connected to a first control input 38 and the base electrode of the transistor 19b to a second control input 39.

The desired functions can be controlled by means of the two control inputs 38 and 39. Both inputs in the open condition implies that, due to the equal base resistors 36 and 37, the differential amplifier 39 is balanced. The collector voltages of the transistor 19a and 19b are equally large and consequently the controllers 24, 25, 26 and 27 are adjusted to $\alpha=\frac{1}{2}$. This implies stereo reception.

If control input 38 is connected to ground and control input 39 is open, transistor 19a is in its blocking state and 19b conducts. Consequently the collector potential of transistor 19a is substantially higher than the collector potential of transistor 19b. The transistors b of the controllers 24, 25, 26, 27 are all conducting and the transistors a are completely cutoff. This implies that $\alpha=0$; L+R is applied to the two junction points K3 and K4; this is mono reproduction.

When the control input 38 is open and the control input 39 is connected to ground, transistor 19a conducts and transistor 19b is cutoff. The collector potential of 19b is substantially higher than the potential of 19a. The transistors a of the controllers 24, 25, 26 and 27 are conducting and the transistors b of these controllers are cutoff. This implies $\alpha=1$; the junction points K3 and K4 receive L−R and R−L, respectively, which implies maximum enhanced stereo.

If the control inputs 38 and 39 are connected to ground via mechanically or electronically variable resistors, then the change-over mono-stereo-enhanced stereo can be effected continuously and gradually. It is of course alternatively possible to apply controllable voltages or currents to the respective terminals 38 and 39, instead of using variable resistors.

In order to render the circuit also suitable for the reception of two non-stereophonic sound signals, the signal current generators 17 and 18 and the "controllers" 28 and 29 are provided. These controllers actually function only as signal current switches. For this purpose, the base electrodes of the transistors 28a and 29a are connected to the collector electrode of a switching transistor 40 which is provided with collector resistor 41 connected to the positive supply voltage terminal (+). The base electrodes of the transistors 28b and 29a are connected to a positive voltage V3 and the base electrode of the switching transistor 40 is connected to a third control input 42.

If a monaural signal or two stereophonic signals are received, the control input 42 remains open, so that the transistor 40 is cutoff. The base electrodes of transistors 28a and 29a then have, via resistor 41, a higher potential than the base electrodes of transistors 28b and 29b. The output currents of the transistors 17a and 18a flow unused to the positive supply voltage terminal (+) via transistors 28a and 29a.

On receipt of two non-stereophonic signals A and B the signal·A at the input terminal 20 and the signal B, at the input terminal 21 are simultaneously available. If the user wants to listen to the signal A, then the control input 38 is connected to ground, the control input 39 is left open and the control input 42 is connected to ground. The transistor 40 is now in the non-conductive state and the circuit functions as in mono reception. Instead of the L+R signal, the A signal is now applied to the junction points K3 and K4, respectively via the respective transistors 13a and 14a and via the respective transistors 24b and 25b. Consequently, both sound channels 7 and 8 receive the A signal.

If the user wants to listen to the B signal, then the transistor 40 is rendered conductive (base open). The inputs 38 and 39 do not change state (38 grounded = low, 39 open = high). Due to the base potential of the transistors 28a, 29a which is now low the transistors 28b, 29b are rendered conductive, causing the B-signal currents produced by transistors 17a and 18a to flow to the junction points K3 and K4, respectively via transistors 28b and 29b. A diode 43 connected between the base electrodes of the transistors 24b and 25b on the one hand and the collector electrode of transistor 40 on the other hand reduces the base potentials of the transistors 24b and 25b to such a low value that the A-signal currents produced by the transistors 13a and 14a flow away unused via the transistors 24a and 25a.

What is claimed is:

1. An arrangement for receiving TV-signals containing left and right stereo sound signals, a first sound carrier being frequency-modulated by the sum signal (L+R) of the two stereo sound signals and a second sound carrier being frequency-modulated by twice the right stereo sound signal (2R), comprising a first FM-demodulator for demodulating the sum signal from the first carrier and a second FM-demodulator for demodulating twice the right stereo sound signal from the second sound carrier, a matrix circuit for deriving at least the left stereo sound signal from the sum signal and twice the right stereo sound signal, and a left and right sound channel for the respective left and right stereo sound signals, characterized in that the matrix circuit comprises a first submatrix for deriving the difference signal (L−R and/or R−L) of the two stereo sound signals from the sum signal and twice the right stereo sound signal, and a second submatrix for deriving at least the left stereo sound signal from the sum signal and the difference signal, and a difference signal adjusting circuit is coupled between the first and the second sub-matrices for symmetrically adjusting the crosstalk attenuation between the left and the right sound channel.

2. An arrangement as claimed in claim 1, characterized by a sum signal adjusting circuit for controlling the supply of the sum signal to the second sub-matrix, the control of the sum signal adjusting circuit being inverse to the control of the difference signal adjusting circuit.

3. An arrangement for receiving TV-signals containing left and right stereo sound signals, a first sound carrier being frequency-modulated by the sum signal (L+R) of the two stereo sound signals and a second sound carrier being frequency-modulated by twice the right stereo sound signal (2R), comprising a first FM-demodulator for demodulating the sum signal from the first carrier and a second FM-demodulator for demodulating twice the right stereo sound signal from the second sound carrier, a matrix circuit for deriving at least the left stereo sound signal from the sum signal and twice the right stereo sound signal, and a left and right sound channel for the respective left and right stereo sound signals, characterized in that the matrix circuit comprises a first submatrix for deriving the difference signal (L−R and/or R−L) of the two stereo sound signals from the sum signal and twice the right stereo sound signal, and a second submatrix for deriving at least the left stereo sound signal from the sum signal and the difference signal, and said arrangement further comprises a further signal transmission path between the output of the second FM demodulator and the second submatrix for applying the sound signal demodulated by the second FM-demodulator to the two sound channels in the case two non-stereophonic sound signals are received.

4. An arrangement as claimed in claim 1, characterized in that the difference signal adjusting circuit arranged between the first and second sub-matrices functions at the same time as a signal blocking arrangement in the case two non-stereophonic sound signals are received.

5. An arrangement as claimed in claim 2, characterized in that the sum signal adjusting circuit functions at the same time as a signal blocking arrangement on receipt of two non-stereophonic sound signals and reproduction of the signal demodulated by the second FM demodulator.

* * * * *